Dec. 14, 1943.  F. A. NETH ET AL  2,336,699
ROASTER
Filed April 15, 1943
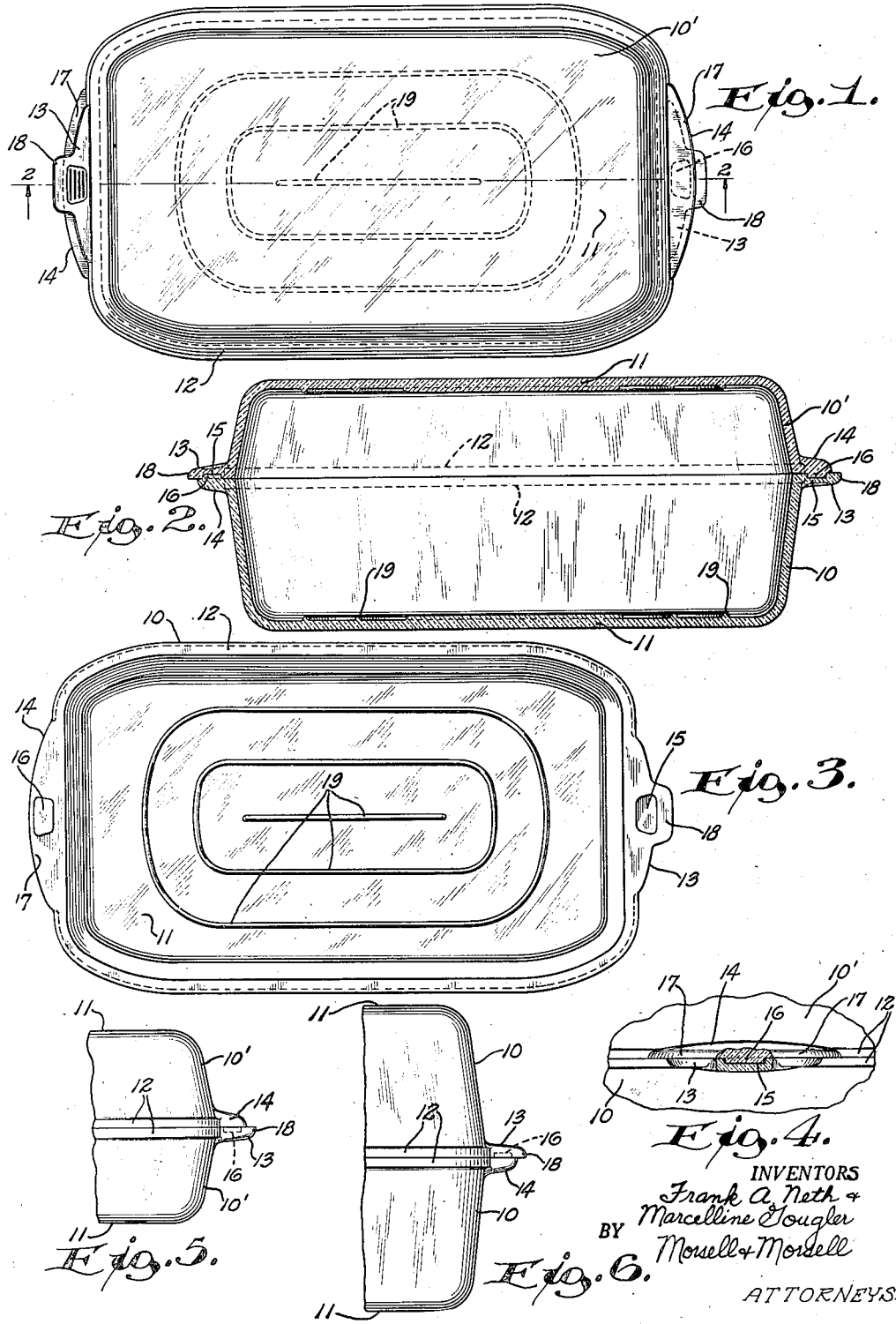
INVENTORS
Frank A. Neth &
Marcelline Tougler
BY Morsell & Morsell
ATTORNEYS Patented Dec. 14, 1943

2,336,699

UNITED STATES PATENT OFFICE 2,336,699

ROASTER

Frank A. Neth and Marcelline Gougler, Chicago, Ill., assignors to The Vollrath Co., Sheboygan, Wis., a corporation of Wisconsin Application April 15, 1943, Serial No. 483,092

4 Claims. (Cl. 99—347)

This invention relates to improvements in roasters and more particularly to utensil sets adapted when in mating relationship, to form roasters, or for individual separated usages as cooking pots or utensils.

It is a primary object of the present invention to provide mating utensil sets wherein the utensils of a set may be used individually as open cooking receptacles, or wherein pairs of the utensils may be combined in different relationships to provide roasters of varying capacities.

A roaster ordinarily comprises a main vessel and a dished covering member therefor adapted to seat securely on the upper periphery of the main vessel. During cooking operations conditions are produced which effect more or less of a seal as between the cover and main receptacle, making it difficult to remove the cover.

With the above in mind it is an object of the present invention to provide complementary or mating utensils which, when disposed in proper relationship, form a roasting receptacle and fitted cover therefor, the mating receptacles each being provided with reverse and complementary handle flanges which effect a lock as between the main receptacle and the covering receptacle but which, whether in reverse or normal position, provide overhanging flanged portions for the ready application thereagainst of finger leverage to effect easy removal of the covering receptacle from the main receptacle.

A further object of the invention is to provide a receptacle adapted to be used alone or in combination with a similar receptacle to form a covered roaster, the end portions of each receptacle being formed with locking handle flanges, one of which is recessed and the other which is provided with a protuberance, cooperative with similar handle flanges on a companion receptacle whereby a pair of companion utensils may be disposed indiscriminately in a position for use with either one side or the other uppermost.

A further object of the invention is to provide a roaster composed of a pair of similar mating receptacles which may be of the same or of different depths and arranged so that when the receptacles are in companion relationship to provide a roaster it is immaterial which receptacle is disposed as the bottom unit.

A further object of the invention is to provide a two-section glass roaster in which the horizontal wall of a section has cast on its inner surface a series of ridges with the result that when a receptacle serves as the bottom section of a roaster the ridges function as a trivet, and when a receptacle serves as the covering section of a roaster the ridges function as an automatic baster.

A further object of the invention is to provide companion receptacles combinable to form a reversible roaster which is of very simple construction, which is strong and durable, which provides for the secure mounting of the cover section but ready removability thereof, which is neat and attractive in appearance, and which is well adapted for the purposes set forth.

With the above and other objects in view the invention consists of the improved roaster and its parts and combinations, as set forth in the claims, and all equivalents thereof.

In the accompanying drawing in which the same reference characters indicate the same parts in all of the views:

Fig. 1 is a plan view of the improved roaster as formed from a pair of different depth companion receptacles;

Fig. 2 is a longitudinal vertical sectional view taken on line 2—2 of Fig. 1;

Fig. 3 is a plan view of the bottom receptacle of the roaster with the cover forming receptacle removed;

Fig. 4 is a fragmentary end view of the roaster with portions of the cooperating handle locking flanges broken away and in section;

Fig. 5 is a fragmentary side view of a roaster formed of two companion receptacles of the same shallow depth and showing the related handle locking flanges at one end of the structure; and Fig. 6 is a similar fragmentary view only showing the roaster as composed of two similar relatively deep receptacles with the handle locking flanges inverted relative to the showing of the same in the other corresponding views.

It is contemplated that the maximum utility of the invention is afforded by the provision of four companion receptacles wherein two of the receptacles are relatively deep and two of the companion receptacles are relatively shallow. In other respects the receptacles are entirely similar. The provision of the specified receptacles permits the use of the same in such combinations as will provide a deep roaster formed from a combination of the two deep receptacles, a roaster of intermediate depth formed from a combination of a deep receptacle with the shallow receptacle, and a shallow roaster formed from a combination of the two relatively shallow receptacles. Additionally, all of the sections may be used individually as pans or open utensils for cooking purposes. While the combinations described are desirable and enhance the use of the invention, nevertheless the invention is not to be restricted thereto and contemplates generally the association of a pair of relatively similar mating sections to form a covered roaster. Under this interpretation of the invention it is immaterial whether the mating sections which are joined to form a roaster are of the same or of varying depths. It is contemplated, however, and the structural features of the invention make it possible, that the roaster formed from two mating sections may be used indiscriminately in one position or in a reverse or inverted position.

Referring now more particularly to the drawing it will appear that an improved roaster is composed of a pair of complementary or mating sections 10 and 10' wherein one section is disposed in a normal position and has its open top covered by the other section, the latter being disposed over the first section in an inverted position so as to form a domed covering. Said sections 10 and 10' are exactly similar, except in the embodiment of Figs. 1, 2 and 3 the top section 10' is a relatively shallow receptacle while the bottom section 10 is a relatively deep receptacle. The receptacles are shaped as shown and are of generally rectangular contour with inclined side walls extending from flat horizontal bottom or top walls 11, as the position may be. The receptacles are preferably formed of glass. Each receptacle, at its open end, has its side wall portion surrounded by a peripheral flange 12. When one receptacle or section is placed upon another, as illustrated, the flanges of the mating receptacles are in abutment.

At each end of a receptacle extending from and substantially beyond the annular flange 12 is a locking handle flange. A handle flange 13 at one end of the receptacle is a female flange, and the flange 14 at the opposite end of the receptacle is a male flange. The differences in the handle flanges will best be observed from Fig. 3 wherein the female flange 13 is formed on its outer surface with a recess 15 and the male flange 14 is formed on its outer surface with a lug or protuberance 16.

When a pair of receptacles 10—10', or 10'—10' or 10—10 are arranged in mating relationship as shown in Figs. 3, 5 or 6 the peripheral flange of the cover forming receptacle will seat securely on the peripheral flange of the bottom receptacle. The receptacles are securely locked in this relationship by virtue of the locking handle flanges 13 and 14. It will be understood that the only observation necessary in the arrangement of a pair of vessels is that if, for instance, the bottom receptacle has a female flange 13 at one end the cover forming receptacle must be so disposed that its male flange is at the same end. The relationship and interengagement of the respective handle locking flanges at the ends of the roaster will then be as is clearly illustrated in Fig. 2. At this point it may be stated that if a roaster of medium depth or capacity is desired, then a shallow receptacle 10' is associated with a deep receptacle 10, as in Fig. 2. If a shallow roaster is required, then a pair of shallow receptacles 10' are arranged as disclosed in Fig. 5. For the provision of a relatively deep roaster a pair of deep receptacles 10 are arranged in mating relationship, as in Fig. 6. It will also be obvious that under any of the conditions enumerated either receptacle may function as the bottom section of the roaster and either receptacle may serve as the roaster cover. Consequently the roaster is readily invertible and no discretion is required as to whether it is used in one position or in an inverted position.

While the locking handle flanges provide effective and convenient means for locking the covering receptacle to the bottom forming receptacle and for bodily handling the composite roaster, they also provide very efficient and effective means for permitting the disengagement of the covering receptacle from the bottom forming receptacle, when desired. It will be appreciated that during cooking operations conditions will develop which will form a lock or seal as between the meeting flanges of the roaster receptacles. To break this seal for the removal of the cover, the cover must be susceptible of being pried up to admit air. The improved handle flanges 13 and 14 conveniently provide for this contingency in any position of use of the roaster. As will be observed from Fig. 1 a handle forming male flange is laterally of its medial portion of greater breadth than a female flange 13 thereby providing an exposed lip 17. As to the end of the roaster at which a male flange is disposed uppermost it will be evident that a user may insert his finger under the protruding lip 17 and obtain leverage sufficient to release the covering receptacle. On the other hand each female handle flange is formed with a centrally disposed outwardly protruding ear 18 which extends beyond the companion handle flange 14. At the end of the roaster wherein a female handle flange is uppermost said overhanging ear portion 18 provides a surface against which finger leverage may be applied for facilitating removal of the covering receptacle.

The inner surface of the horizontal wall 11 of a receptacle or section has cast or otherwise formed thereon a series of ridges 19. In the receptacle which is used as a bottom section or when a receptacle is used alone the ridges 19 function as a trivet holding the meat or cooking food elevated from the bottom surface to prevent the same sticking and burning and allowing the circulation of air and juices. In a receptacle forming the cover section of a roaster the ridges 19 are on the top horizontal inner surface and there function as a self-basting means. During roasting or cooking condensation forms on the top surface of the cover section, collects at the ridges 19 and then drips from the ridges onto the food in the roaster.

As heretofore mentioned, various combinations of receptacles 10 and 10' are possible to provide roasters of different depths and capacities. It is immaterial which receptacle is used as the bottom section of the roaster and under any conditions the sections are securely locked together and convenient handles project from the ends of the roaster. Regardless of which section is uppermost there will be at each handle end of the structure convenient overhanging ears or lips against which finger pressure may be applied for the removal of the covering section. Obviously any of the sections may be used singly for open cooking receptacles or utensils. The improved roaster is of simple and novel construction and is well adapted for the purposes described.

What is claimed as the invention is:

1. A cooking receptacle, comprising a pair of complementary dished vessels, one of which is positionable on the other in an inverted covering position, each vessel being formed with a male handle flange and a female handle flange spaced from the first handle flange, the covering vessel being disposed so that its male handle flange registers with and engages the female handle flange and its female handle flange registers with and engages the male handle flange of the other vessel, but peripheral portions of the mating flanges being out of registration.

2. A cooking receptacle, comprising a pair of complementary dished vessels, one of which is positionable on the other in an inverted covering position, each vessel being formed with a pair of oppositely disposed, dissimilar, fixed handle flanges, the handle flanges of the covering vessel being complementary to and in engagement with the handle flanges of the other vessel and the pairs of engaging handle flanges being formed with cooperating locking means, each handle flange of a cooperating pair having a peripheral portion extending laterally beyond a peripheral portion of its complementary flange to form a lip.

3. A cooking receptacle, comprising a pair of complementary dished vessels, one of which is positionable on the other in an inverted covering position, each vessel being formed with a pair of oppositely disposed, dissimilar, fixed handle flanges, the handle flanges of the covering vessel being complementary to and in engagement with the handle flanges of the other vessel and the pairs of engaging handle flanges being formed with cooperating locking means, the top handle flange of each cooperating pair having a lip portion laterally overhanging the portion of a flange therebelow providing a pressure surface to facilitate removal of the covering vessel.

4. A cooking receptacle, comprising a pair of complementary dished vessels, either of which is positionable on the other in an inverted covering position, each vessel being formed with a fixed male handle flange and a fixed female handle flange spaced from the first handle flange, the covering vessel being disposed so that its male handle flange registers and interlocks with the female handle flange and its female handle flange registers and interlocks with the male handle flange of the other vessel, the top handle flange of each cooperating pair having a lip portion laterally overhanging the portion of a flange therebelow providing a pressure surface to facilitate removal of the covering vessel.

FRANK A. NETH.
MARCELLINE GOUGLER.